United States Patent
Uekita

(10) Patent No.: US 10,053,554 B2
(45) Date of Patent: Aug. 21, 2018

(54) PROPYLENE RESIN COMPOSITION AND STRETCHED CONTAINER FORMED OF THE SAME

(71) Applicant: PRIME POLYMER CO., LTD., Tokyo (JP)

(72) Inventor: Hiroyuki Uekita, Chiba (JP)

(73) Assignee: PRIME POLYMER CO., LTD., Tokyo (JP)

(*) Notice: Subject to any disclaimer, the term of this patent is extended or adjusted under 35 U.S.C. 154(b) by 0 days.

(21) Appl. No.: 15/122,522

(22) PCT Filed: Mar. 9, 2015

(86) PCT No.: PCT/JP2015/056785
§ 371 (c)(1),
(2) Date: Aug. 30, 2016

(87) PCT Pub. No.: WO2015/137268
PCT Pub. Date: Sep. 17, 2015

(65) Prior Publication Data
US 2017/0066904 A1    Mar. 9, 2017

(30) Foreign Application Priority Data
Mar. 10, 2014 (JP) .................................. 2014-046072

(51) Int. Cl.
| B29C 49/04 | (2006.01) |
| B29C 49/06 | (2006.01) |
| B29C 49/12 | (2006.01) |
| C08K 5/098 | (2006.01) |
| C08K 5/523 | (2006.01) |
| C08L 23/14 | (2006.01) |
| B29K 23/00 | (2006.01) |
| B29L 31/00 | (2006.01) |
| B29C 49/00 | (2006.01) |

(52) U.S. Cl.
CPC ............. *C08K 5/523* (2013.01); *B29C 49/04* (2013.01); *B29C 49/06* (2013.01); *B29C 49/12* (2013.01); *C08K 5/098* (2013.01); *C08L 23/142* (2013.01); *B29C 49/0005* (2013.01); *B29K 2023/12* (2013.01); *B29L 2031/712* (2013.01); *C08L 2201/10* (2013.01); *C08L 2205/025* (2013.01)

(58) Field of Classification Search
CPC ....... C08K 5/523; C08K 5/098; C08L 23/142; C08L 2201/10; C08L 2205/025; B29C 49/04; B29C 49/06; B29C 49/12; B29K 2023/12; B29L 2031/712
See application file for complete search history.

(56) References Cited

U.S. PATENT DOCUMENTS

| 4,596,833 A * | 6/1986 | Endo ...................... C08J 9/0038 521/143 |
| 5,328,950 A * | 7/1994 | Yokote .................... C08K 3/22 524/117 |
| 5,342,868 A * | 8/1994 | Kimura .................. C08K 5/098 524/108 |

(Continued)

FOREIGN PATENT DOCUMENTS

| EP | 2 006 314 A2 | 12/2008 |
| EP | 2 006 314 A9 | 7/2009 |
| JP | 2002-275330 A | 9/2002 |

(Continued)

OTHER PUBLICATIONS

Machine translation of JP2002-348421 downloaded Sep. 22, 2017.*

(Continued)

*Primary Examiner* — Irina S Zemel
*Assistant Examiner* — Jeffrey S Lenihan
(74) *Attorney, Agent, or Firm* — Foley & Lardner LLP

(57) ABSTRACT

There is shown a propylene resin composition including 100 parts by weight of (A) a propylene resin and 0.05 to 0.5 part by weight of (B) a nucleating agent containing an organophosphoric ester compound represented by the formula (B1) and at least one kind selected from aliphatic carboxylic acids and derivatives thereof and containing an alkali metal element as an essential component, wherein MFR is 11 to 100 g/10 min, the crystalline melting point is 140 to 155° C., and in an elution curve determined by a temperature rising elution fractionation chromatograph (TREF), the elution quantity Wp1 (% by weight) in a temperature range higher than the main elution peak temperature Tp and the elution quantity Wp2 (% by weight) in a temperature range not higher than 10° C. are each in a specific range.

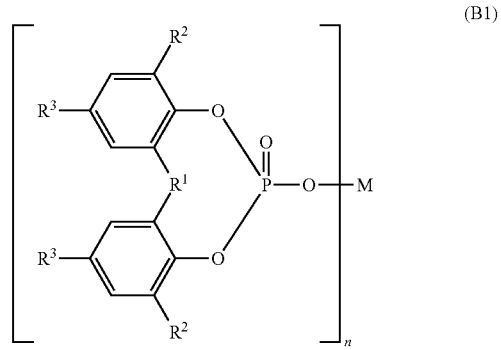

(B1)

10 Claims, No Drawings

(56) References Cited

U.S. PATENT DOCUMENTS

2009/0069523 A1    3/2009   Itakura et al.
2010/0040813 A1*   2/2010   Wada .................. B65D 1/0207
                                                                                   428/35.7

FOREIGN PATENT DOCUMENTS

| JP | 2002-348421 A | 12/2002 |
| JP | 2003-268044 A | 9/2003 |
| JP | 2007-119747 A | 5/2007 |
| JP | 2013-209448 A | 10/2013 |
| WO | WO-2011/090101 A1 | 7/2011 |

OTHER PUBLICATIONS

Machine translation of JP2007-119747 downloaded Sep. 22, 2017.*
International Search report issued in International Patent Application No. PCT/JP2015/056785 dated Jun. 2, 2015.
Extended European Search Report in corresponding application No. 15760887 dated Oct. 19, 2017.

* cited by examiner

PROPYLENE RESIN COMPOSITION AND STRETCHED CONTAINER FORMED OF THE SAME

CROSS-REFERENCE TO RELATED APPLICATIONS

The present application is a U.S. national stage application of International Patent Application No. PCT/JP2015/056785, filed Mar. 9, 2015, which claims the benefit of priority to Japanese Patent Application No. 2014-046072, filed Mar. 10, 2014, the entireties of which are hereby incorporated by reference.

TECHNICAL FIELD

The present invention relates to a propylene resin composition and a stretched container formed of the same.

BACKGROUND ART

Since containers formed of propylene resins are lightweight and excellent in chemical resistance and have excellent transparency, they have been widely applied also to containers for foods, toiletries, detergents, medical use, etc. As a material of conventional stretch blow molded containers, a propylene homopolymer has been exclusively used because rigidity of containers is regarded as important. As a process for industrially producing a stretch blow molded container, a process including subjecting a propylene homopolymer to melt injection molding to form a preform once, then longitudinally stretching the preform by a stretching rod and subsequently laterally stretching it by a pressurized fluid has been generally used.

However, the propylene homopolymer has a narrow stretchable temperature range, and therefore, it is necessary to strictly control the temperature in the stretching step. If this stretchable temperature range can be widened, the temperature control in summer or winter will become easy. Further, if a material having excellent stretchability can be used, a container having a thinner wall will be obtained, and the thickness of the resulting container will become more uniform, so that various performance will be improved. Accordingly, a propylene resin having stretchability superior to that of the propylene homopolymer used at present is desired.

In a patent literature 1, a polypropylene resin composition containing polypropylene having a melt flow rate (MFR), a regioirregular unit and a molecular weight distribution that are within specific ranges and a nucleating agent, and a stretch blow molded container formed of the composition are described.

In a patent literature 2, a propylene resin composition composed of a propylene/α-olefin copolymer containing an α-olefin other than propylene in an amount of 1 to 5% by weight and a propylene homopolymer or a propylene/ethylene random copolymer having an ethylene content of less than 1% by weight, and a stretch blow molded container formed of the composition are described.

However, a further new material, which has a wide moldable temperature range in stretch blow molding (such temperature range being also referred to as "stretch blow molding temperature range" hereinafter) while keeping a balance between such properties and other properties such as heat resistance and provides a container having small change in container shrinkage and transparency between before and after heat treatment, is desired as a propylene resin composition.

CITATION LIST

Patent Literature

Patent literature 1: JP 2002-275330 A
Patent literature 2: JP 2003-268044 A

SUMMARY OF INVENTION

Technical Problem

The present invention addresses the problem of providing a propylene resin composition which has a wide stretch blow molding temperature range and is capable of providing a stretched container having small container shrinkage after heat treatment and having excellent transparency of the container side surface even after heat treatment.

Solution to Problem

The present inventors have found that in stretch blow molding using a propylene resin composition, the composition needs to exhibit good stretchability, and in order to realize it, an appropriate additive is added, thereby widening the stretch blow molding temperature range, a high-melting point component is adjusted, thereby exhibiting heat resistance, and a low-melting point component is adjusted, thereby achieving reduction of a low-temperature elution component and a bleed component and particularly exhibiting transparency after heat treatment. Thus, the present inventors have accomplished the present invention.

That is to say, the present invention relates to, for example, the following [1] to [5].

[1] A propylene resin composition comprising:
100 parts by weight of (A) a propylene resin, and
0.05 to 0.5 part by weight of (B) a nucleating agent containing an organophosphoric ester compound represented by the formula (B1) and at least one kind selected from aliphatic carboxylic acids and derivatives thereof and containing an alkali metal element as an essential component, wherein:

(1) the melt flow rate (MFR) of the composition, as measured at a measurement temperature of 230° C. under a load of 2.16 kg in accordance with ASTM D-1238, is 11 to 100 g/10 min, (2) the crystalline melting point of the resin in the composition, as measured by a differential scanning calorimeter (DSC) in accordance with JIS-K7121, is 140 to 155° C., (3) when a main elution peak temperature in an elution curve of the composition determined by a temperature rising elution fractionation chromatograph (TREF) is represented by Tp, the elution quantity Wp1 (% by weight) in a temperature range higher than Tp, based on the total elution quantity in a temperature range of 0 to 135° C., is not less than 26.5% by weight, and (4) in an elution curve of the composition determined by a temperature rising elution fractionation chromatograph (TREF), the elution quantity Wp2 (% by weight) in a temperature range not higher than 10° C., based on the total elution quantity in a temperature range of 0 to 135° C., is not more than 4.0% by weight,

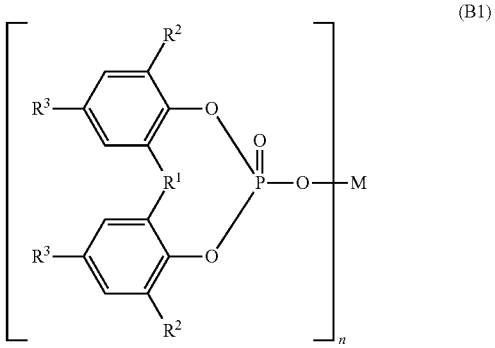

(B1)

wherein $R^1$ is a divalent hydrocarbon group of 1 to 10 carbon atoms, $R^2$ and $R^3$ are each independently hydrogen or a hydrocarbon group of 1 to 10 carbon atoms, $R^2$ and $R^3$ may be the same as or different from each other, M is an n-valent metal atom, and n is an integer of 1 to 3.

[2] The propylene resin composition of the above [1], wherein the propylene resin (A) comprises:

1 to 99 parts by weight of a propylene resin (A1) which is a copolymer of propylene and at least one α-olefin selected from ethylene and α-olefins of 4 to 20 carbon atoms and has a crystalline melting point, as measured by a differential scanning calorimeter (DSC) in accordance with JIS-K7121, of 130 to 150° C., and 99 to 1 part by weight of a propylene resin (A2) which is a propylene homopolymer or a copolymer of propylene and at least one α-olefin selected from ethylene and α-olefins of 4 to 20 carbon atoms and has a crystalline melting point, as measured by a differential scanning calorimeter (DSC) in accordance with JIS-K7121, of 151 to 165° C., with the proviso that the total amount of the resin (A1) and the resin (A2) is 100 parts by weight.

[3] The propylene resin composition of the above [2], wherein a difference between the crystalline melting point of the propylene resin (A2) and the crystalline melting point of the propylene resin (A1) is 13 to 35° C.

[4] The propylene resin composition of anyone of the above [1] to [3], wherein the at least one kind selected from aliphatic carboxylic acids and derivatives thereof in the nucleating agent (B) is at least one kind selected from aliphatic monocarboxylic acids of 14 to 20 carbon atoms and derivatives thereof.

[5] A polypropylene-based stretched container formed of the propylene resin composition of any one of the above [1] to [4].

Advantageous Effects of Invention

According to the present invention, a propylene resin composition which has a wide stretch blow molding temperature range and is capable of providing a stretched container having small container shrinkage after heat treatment and having excellent transparency of the container side surface even after heat treatment can be provided.

DESCRIPTION OF EMBODIMENTS

The propylene resin composition and the stretched container according to the present invention are described hereinafter.

[Propylene Resin Composition]

The propylene resin composition of the present invention is characterized by containing a specific nucleating agent (B) in an amount of 0.05 to 0.5 part by weight based on 100 parts by weight of a propylene resin (A) and satisfying the requirements (1) to (4). Details of the measurement conditions for each requirement are described in the section of working examples.

<<Requirement (1)>>

The melt flow rate (MFR) of the propylene resin composition, as measured at a measurement temperature of 230° C. under a load of 2.16 kg in accordance with ASTM D-1238, is 11 to 100 g/10 min. The MFR is preferably 15 to 60 g/10 min, more preferably 15 to 40 g/10 min. When the MFR is in the above range, a preform obtained from the propylene resin composition is excellent in uniform stretchability, and a stretched container obtained from the composition is excellent in surface smoothness. If the MFR is more than the upper limit of the above range, the stretch blow molding temperature range is extremely narrowed. If the MFR is less than the lower limit of the above range, container shrinkage after heat treatment increases, and transparency of the container side surface after heat treatment is deteriorated.

MFR of the propylene resin composition can be adjusted by, for example, controlling MFR of the propylene resin (A) blended or adding an organic peroxide.

<<Requirement (2)>>

The propylene resin composition has the crystalline melting point of the resin, as measured by a differential scanning calorimeter (DSC) in accordance with JIS-K7121, of 140 to 155° C. The crystalline melting point is preferably 140 to 150° C. In the case where plural endothermic peaks of the resin are present, the maximum endothermic peak top is defined as a crystalline melting point. When the crystalline melting point is in the above range, a preform obtained from the propylene resin composition is excellent in stretch blow molding property, and a stretched container obtained from the composition is excellent in container transparency.

The crystalline melting point of the propylene resin composition can be adjusted by, for example, controlling a crystalline melting point of the propylene resin (A) blended, specifically by controlling crystalline melting points of the later-described propylene reins (A1) and (A2) and amounts thereof blended.

<<Requirement (3)>>

When a main elution peak temperature in an elution curve of the propylene resin composition determined by a temperature rising elution fractionation chromatograph (TREF) is represented by Tp, the elution quantity Wp1 (% by weight) in a temperature range higher than Tp (higher than Tp (° C.) but not higher than 135° C.), based on the total elution quantity in a temperature range of 0 to 135° C., is not less than 26.5% by weight. The Wp1 is preferably not less than 27.0% by weight, more preferably not less than 28.0% by weight. When the Wp1 is in the above range, the stretch blow molding temperature range of a preform obtained from the propylene resin composition is widened, and the volume retention ratio of a stretched container after heat treatment is excellent. If the Wp1 is less than the above value, the stretch blow molding temperature range is narrowed, and the amount of a high-melting point component based on the whole resin composition is reduced, so that not only is the moldability deteriorated but also the container shrinkage after heat treatment increases. The main elution peak temperature means a temperature at which the elution quantity becomes maximum in the whole elution chart in a temperature range of 0 to 135° C.

Also when the Wp1 becomes too high, stretch blow molding property and a volume retention ratio of a stretched container after heat treatment are sometimes deteriorated. On this account, the upper limit of the Wp1 is preferably 50% by weight, more preferably 40% by weight.

When the propylene resin composition contains the later-described propylene resin (A1) or (A2) alone, the Wp1 of the resin composition is usually in the range of 5 to 26% by weight. On this account, the Wp1 of the resin composition can be adjusted by controlling the crystalline melting points of the propylene resins (A1) and (A2) and the amounts thereof blended. That is to say, by using the propylene resin (A1) having a low crystalline melting point as a main component and considering the main elution peak temperature to be on the basis of the resin (A1) and increasing the amount of the propylene resin (A2) having a high crystalline melting point, the Wp1 is increased.

<<Requirement (4)>>

In an elution curve of the propylene resin composition determined by a temperature rising elution fractionation chromatograph (TREF), the elution quantity Wp2 (% by weight) in a temperature range not higher than 10° C. (0 to 10° C.), based on the total elution quantity in a temperature range of 0 to 135° C., is not more than 4.0% by weight. The Wp2 is preferably not more than 3.5% by weight, more preferably not more than 3.0% by weight. When the Wp2 is in the above range, transparency of a stretched container obtained from the propylene resin composition after heat treatment becomes good. If the Wp2 exceeds the above value, a low-temperature elution component is liable to bleed out on the resin surface, and transparency of a stretched container after heat treatment is deteriorated.

As the Wp2 is decreased, transparency of the stretched container after heat treatment tends to become better, and the lower limit of the Wp2 is 0% by weight, preferably 0.1% by weight.

The Wp2 of the propylene resin composition can be adjusted by, for example, blending a specific nucleating agent (B) or controlling a crystalline melting point of the later-described propylene resin (A1). As guidance, a specific nucleating agent (B) is blended or the crystalline melting point of the later-described propylene resin (A1) is raised, whereby the Wp2 is decreased.

[Propylene Resin (A)]

The propylene resin (A) preferably comprises 1 to 99 parts by weight of the following propylene resin (A1) and 99 to 1 part by weight of the following propylene resin (A2), with the proviso that the total amount of the resin (A1) and the resin (A2) is 100 parts by weight.

The proportions of the resin (A1) and the resin (A2) are preferably those of 98 to 60 parts by weight of the resin (A1) and 2 to 40 parts by weight of the resin (A2), more preferably 98 to 70 parts by weight of the resin (A1) and 2 to 30 parts by weight of the resin (A2), still more preferably 98 to 80 parts by weight of the resin (A1) and 2 to 20 parts by weight of the resin (A2). When the proportions of the resin (A1) and the resin (A2) are in the above range, Wp1 and Wp2 based on the temperature rising elution fractionation chromatograph become proper numerical values, so that the stretch blow molding temperature range of a preform obtained from the propylene resin composition is widened, and the volume retention ratio of a stretched container after heat treatment is also excellent.

In the present specification, a constituent unit derived from propylene and a constituent unit derived from an α-olefin, said constituent units being capable of constituting the propylene resin, are also referred to simply as a "propylene unit" and an "α-olefin unit", respectively, and the contents of these constituent units are also referred to simply as a "propylene content" and an "α-olefin content", respectively.

<Propylene Resin (A1)>

The propylene resin (A1) is a copolymer of propylene and at least one α-olefin selected from ethylene and α-olefins of 4 to 20 carbon atoms. The resin (A1) is preferably a propylene/α-olefin random copolymer.

Examples of the α-olefins in the resin (A1) include ethylene, and α-olefins of 4 to 20 carbon atoms, specifically 1-butene, 1-pentene, 1-hexene, 4-methyl-1-pentene, 1-octene, 1-decene, 1-dodecene, 1-tetradodecene, 1-hexadodecene, 1-octodecene, 1-eicosene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, ethyl-1-octene, methyl-1-nonene and the like. Of these, ethylene and α-olefins of 4 to 8 carbon atoms are preferable, and ethylene is particularly preferable.

Specific examples of the resins (A1) include a propylene/ethylene random copolymer, a propylene/1-butene random copolymer, a propylene/1-pentene random copolymer, a propylene/1-hexene random copolymer, a propylene/1-octene random copolymer and a propylene/ethylene/1-butene random copolymer. Of these, a propylene/ethylene random copolymer is particularly preferable.

The crystalline melting point of the propylene resin (A1), as measured by a differential scanning calorimeter (DSC) in accordance with JIS-K7121, is usually 130 to 150° C., preferably 130 to 145° C., more preferably 135 to 145° C. When the crystalline melting point as measured by DSC is in the above range, the crystalline melting point of the propylene resin composition and a value of the temperature rising elution fractionation chromatograph become proper values, and from the viewpoints of stretch blow molding property of a preform obtained from the propylene resin composition and transparency of a stretched container obtained from the composition, such a crystalline melting point is preferable.

The crystalline melting point can be controlled by an ethylene content or a content of an α-olefin of 4 to 20 carbon atoms based on the propylene content. In order to obtain the above crystalline melting point, it is necessary to take into consideration a preferred ethylene content or a type or a content of an α-olefin of 4 to 20 carbon atoms and also a relationship between the crystalline melting point and MFR, a molecular weight distribution or the like, and in the propylene resin (A1), the ethylene content is preferably 1.9 to 5.4% by weight, more preferably 2.0 to 4.8% by weight, still more preferably 3.0 to 4.0% by weight.

The melt flow rate (MFR) of the propylene resin (A1), as measured at a measurement temperature of 230° C. under a load of 2.16 kg in accordance with ASTM D-1238, is usually 1 to 100 g/10 min, preferably 5 to 50 g/10 min. When the MFR is in the above range, fluidity of the propylene resin is in a range preferable for producing a preform having excellent uniform stretchability and surface smoothness, so that such a melt flow rate is preferable. If the value of MFR exceeds the upper limit of the above range, moldability in production of a stretched container is sometimes deteriorated, and impact resistance of a stretched container is sometimes deteriorated. If the value of MFR is less than the lower limit of the above range, smoothness of a stretched container is sometimes deteriorated.

<Propylene resin (A2)>

The propylene resin (A2) is a propylene homopolymer or a copolymer of propylene and at least one α-olefin selected from ethylene and α-olefins of 4 to 20 carbon atoms. In the case of a copolymer, the resin (A2) is preferably a propylene/α-olefin random copolymer.

Examples of the α-olefins in the resin (A2) include ethylene, and α-olefins of 4 to 20 carbon atoms, specifically 1-butene, 1-pentene, 1-hexene, 4-methyl-1-pentene, 1-octene, 1-decene, 1-dodecene, 1-tetradodecene, 1-hexadodecene, 1-octadodecene, 1-eicosene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, ethyl-1-octene, methyl-1-nonene and the like. Of these, ethylene and α-olefins of 4 to 8 carbon atoms are preferable, and ethylene is particularly preferable.

Specific examples of the resins (A2) include not only a propylene homopolymer but also a propylene/ethylene random copolymer, a propylene/1-butene random copolymer, a propylene/1-pentene random copolymer, a propylene/1-hexene random copolymer, a propylene/1-octene random copolymer and a propylene/ethylene/1-butene random copolymer. Of these, a propylene homopolymer or a propylene/ethylene random copolymer is particularly preferable.

The crystalline melting point of the propylene resin (A2), as measured by a differential scanning calorimeter (DSC) in accordance with JIS-K7121, is usually 151 to 165° C., preferably 155 to 165° C., more preferably 158 to 165° C. When the crystalline melting point as measured by DSC is in the above range, the crystalline melting point of the propylene resin composition and a value of the temperature rising elution fractionation chromatograph become proper values, and stretch blow molding property of a preform obtained from the propylene resin composition and a volume retention ratio of a stretched container obtained from the composition after heat treatment are excellent, so that such a crystalline melting point is preferable.

A difference between the crystalline melting point of the propylene resin (A2) and the crystalline melting point of the propylene resin (A1) is preferably 13 to 35° C., more preferably 14 to 30° C. When the difference in the melting point is in the above range, Wp1 and Wp2 based on TREF become proper values, so that such a difference is preferable.

Similarly to the resin (A1), the crystalline melting point can be controlled by an ethylene content or a content of an α-olefin of 4 to 20 carbon atoms based on the propylene content, but it is necessary to note that the range of the crystalline melting point of the resin (A2) is a range of higher temperature than that of the resin (A1). For determining the crystalline melting point, it is necessary to take into consideration a preferred ethylene content or a type or a content of an α-olefin of 4 to 20 carbon atoms and also a relationship between the crystalline melting point and MFR, a molecular weight distribution or the like, and in order to obtain the above melting point, for example, the ethylene content in the propylene resin (A2) is preferably 0 to 1.8% by weight, more preferably 0 to 1.2% by weight, still more preferably 0 to 0.8% by weight.

The melt flow rate (MFR) of the propylene resin (A2), as measured at a measurement temperature of 230° C. under a load of 2.16 kg in accordance with ASTM D-1238, is usually 1 to 100 g/10 min, preferably 5 to 50 g/10 min, still more preferably 10 to 40 g/10 min. When the MFR is in the above range, a preform obtained from the propylene resin composition is excellent in uniform stretchability and a stretched container obtained from the composition is excellent in surface smoothness, so that such MFR is preferable.

<Production Process for Propylene Resins (A1) and (A2)>

The production process for the propylene resins (A1) and (A2) is not specifically restricted. As a polymerization catalyst, for example, a titanium-based Ziegler catalyst may be used or a metallocene catalyst may be used. When propylene and an α-olefin are copolymerized, random copolymerization is preferable. In the polymerization, a chain transfer agent such as hydrogen gas may be introduced. Further, the propylene resin obtained by polymerization may be subjected to melt kneading in the presence of an organic peroxide.

The MFR of the propylene resins (A1) and (A2) can be adjusted by, for example, the introduction amount of a chain transfer agent (e.g., hydrogen gas) used in the production of the propylene resins (A1) and (A2). That is to say, by increasing the introduction amount of the chain transfer agent (e.g., hydrogen gas) based on the amount of the raw material monomer introduced in the polymerization, the MFR of the propylene resins (A1) and (A2) can be raised. By decreasing the introduction amount of the chain transfer agent (e.g., hydrogen gas) based on the amount of the raw material monomer introduced in the polymerization, the MFR of the propylene resins (A1) and (A2) can be lowered.

The MFR of the propylene resin composition can be adjusted also by subjecting the propylene resin obtained by polymerization to melt kneading in the presence of an organic peroxide. By carrying out melt kneading in the presence of an organic peroxide, the MFR can be raised, and by increasing the amount of the organic peroxide added, the MFR can be further raised.

As the melt kneading method, there can be mentioned a method including adding the nucleating agent (B), the organic peroxide, and if necessary, other additives to the propylene resin (A), then introducing them into a mixing machine, such as Henschel mixer, Banbury mixer or tumbler mixer, to perform mixing and then molding the resulting mixture by an extruder, such as single screw extruder or twin-screw extruder, to obtain a strand of a propylene resin composition. The strand is usually cut into pellets by the use of a pelletizer or the like prior to carrying out blow molding.

The crystalline melting point of the propylene resin (A1) can be adjusted by, for example, changing the introduction amount ratio between propylene and at least one α-olefin selected from ethylene and α-olefins of 4 to 20 carbon atoms in the copolymerization in the production of the propylene resin (A1). That is to say, by increasing the introduction amount of the α-olefin based on the introduction amount of propylene, the crystalline melting point can be lowered, and by decreasing the introduction amount of the α-olefin based on the introduction amount of propylene, the crystalline melting point can be raised. Similarly to the above, also the crystalline melting point of the propylene resin (A2) can be adjusted by changing the amount of the α-olefin based on the amount of propylene, said α-olefin being introduced when needed.

[Nucleating Agent (B)]

The nucleating agent (B) contains an organophosphoric ester compound (B1) represented by the formula (B1) and at least one compound (B2) selected from aliphatic carboxylic acids and derivatives thereof, and contains an alkali metal element as an essential component. By the use of such a nucleating agent (B), a container having small container shrinkage after heat treatment and having excellent transparency can be provided.

When the total amount of the compound (B1) and the compound (B2) is 100% by mol, the nucleating agent (B) contains the compound (B1) usually in an amount of 50 to 80% by mol, preferably 60 to 75% by mol, more preferably 65 to 70% by mol, and contains the compound (B2) usually in an amount of 20 to 50% by mol, preferably 25 to 40% by mol, more preferably 30 to 35% by mol.

The nucleating agent (B) contains an alkali metal element as an essential component. The alkali metal element is preferably contained as an alkali metal salt. Examples of the alkali metal salt include at least one kind selected from organophosphoric ester compounds represented by the formula (B1) (M in the formula (B1)=alkali metal element) and the later-described alkali metal salts of aliphatic carboxylic acids or derivatives thereof. The alkali metal salt may be present as an organophosphoric ester compound represented by the formula (B1) (M in the formula (B1)=alkali metal element) or may be present as a salt of an aliphatic carboxylic acid or a derivative thereof, or both of them may be present.

<Organophosphoric Ester Compound>

The organophosphoric ester compound is represented by the formula (B1).

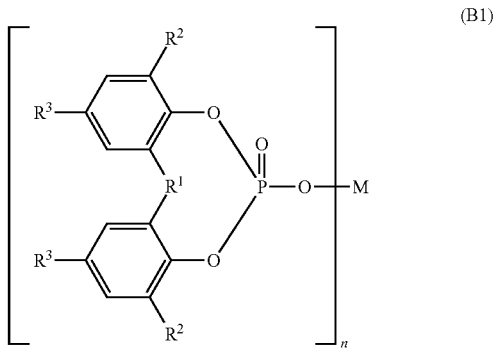

In the formula (B1), $R^1$ is a divalent hydrocarbon group of 1 to 10 carbon atoms, $R^2$ and $R^3$ are each independently hydrogen or a hydrocarbon group of 1 to 10 carbon atoms, $R^2$ and $R^3$ may be the same as or different from each other, M is an n-valent metal atom, and n is an integer of 1 to 3.

Examples of the divalent hydrocarbon groups of 1 to 10 carbon atoms as $R^1$ include alkanediyl groups, such as methylene group, ethanediyl group, butanediyl group and t-octylmethylene group. Of these, methylene group or ethanediyl group is preferable, and methylene group is most preferable.

Examples of the hydrocarbon groups of 1 to 10 carbon atoms as $R^2$ or $R^3$ include alkyl groups of 1 to 10 carbon atoms, such as methyl group, ethyl group, i-propyl group, n-butyl group and t-butyl group. Of these, alkyl groups of 1 to 4 carbon atoms, such as methyl group, ethyl group and t-butyl group, are preferable, and t-butyl group is particularly preferable. $R^2$ and $R^3$ are preferably the same groups as each other.

n is an integer of 1 to 3, preferably 1.

Examples of the metal atoms represented by M include alkali metal elements, such as lithium, sodium, potassium and rubidium, Group 2 metal elements of the periodic table, such as magnesium, calcium and barium, and Group 13 metal elements of the periodic table, such as aluminum. Of these, alkali metal elements are preferable, sodium and lithium are more preferable, and lithium is particularly preferable.

Specific examples of the organophosphoric ester compounds represented by the formula (B1) include:

sodium-2,2'-methylenebis(4,6-dimethylphenyl)phosphate, sodium-2,2'-methylenebis(4,6-diethylphenyl)phosphate, sodium-2,2'-methylenebis(4,6-di-t-butylphenyl)phosphate, sodium-2,2'-methylenebis(4-methyl-6-t-butylphenyl)phosphate, sodium-2,2'-methylenebis(4-ethyl-6-t-butylphenyl)phosphate, sodium-2,2'-ethylidenebis(4,6-di-t-butylphenyl)phosphate, sodium-2,2'-ethylidenebis(4-i-propyl-6-t-butylphenyl)phosphate, sodium-2,2'-ethylidenebis(4-n-butyl-6-t-butylphenyl)phosphate, sodium-2,2'-butylidenebis(4,6-dimethylphenyl)phosphate, sodium-2,2'-butylidenebis(4,6-di-t-butylphenyl)phosphate, sodium-2,2'-t-octylmethylenebis(4,6-dimethylphenyl)phosphate, sodium-2,2'-t-octylmethylenebis(4,6-di-t-butylphenyl)phosphate, lithium-2,2'-methylenebis(4,6-di-t-butylphenyl)phosphate, lithium-2,2'-methylenebis(4-methyl-6-t-butylphenyl)phosphate, lithium-2,2'-methylenebis(4-ethyl-6-t-butylphenyl)phosphate, lithium-2,2'-ethylidenebis(4,6-di-t-butylphenyl)phosphate, potassium-2,2'-ethylidenebis(4,6-di-t-butylphenyl)phosphate, calcium-bis[2,2'-methylenebis(4,6-di-t-butylphenyl)phosphate], calcium-bis[2,2'-ethylidenebis(4,6-di-t-butylphenyl)phosphate], magnesium-bis[2,2'-methylenebis(4,6-di-t-butylphenyl)phosphate], magnesium-bis[2,2'-ethylidenebis(4,6-di-t-butylphenyl)phosphate], barium-bis[2,2'-methylenebis(4,6-di-t-butylphenyl)phosphate], barium-bis[2,2'-ethylidenebis(4,6-di-t-butylphenyl)phosphate], aluminum-tris[2,2'-methylenebis(4,6-di-t-butylphenyl)phosphate], and aluminum-tris[2,2'-ethylidenebis(4,6-di-t-butylphenyl)phosphate].

Of these, sodium-2,2'-methylenebis(4,6-di-t-butylphenyl)phosphate and lithium-2,2'-methylenebis(4,6-di-t-butylphenyl)phosphate are preferable, and lithium-2,2'-methylenebis(4,6-di-t-butylphenyl)phosphate is more preferable.

The organophosphoric ester compounds may be used singly or in combination of two or more kinds.

<Aliphatic Carboxylic Acid and Derivative Thereof (B2)>

The nucleating agent (B) contains at least one compound (B2) selected from aliphatic carboxylic acids and derivatives thereof.

Examples of the aliphatic carboxylic acids in the nucleating agent (B) include aliphatic dicarboxylic acids of 4 to 12 carbon atoms and aliphatic monocarboxylic acids of 14 to 20 carbon atoms. A part of alkyl groups contained in these acids may have been oxidized.

Examples of the aliphatic dicarboxylic acids of 4 to 12 carbon atoms include saturated aliphatic dicarboxylic acids, such as succinic acid, glutaric acid, adipic acid, suberic acid and sebacic acid. Examples of the aliphatic monocarboxylic acids of 14 to 20 carbon atoms include saturated aliphatic monocarboxylic acids, such as myristic acid, pentadecylic acid, palmitic acid, margaric acid and stearic acid; and unsaturated aliphatic monocarboxylic acids, such as oleic acid, linoleic acid, linolenic acid and arachidonic acid.

Examples of the derivatives of aliphatic carboxylic acids in the nucleating agent (B) include substituted derivatives, such as compounds wherein one or more hydrogen atoms bonded to carbon atoms in the aforesaid aliphatic carboxylic acids are substituted by hydroxyl groups, and metal salts of the aforesaid aliphatic carboxylic acids or substituted derivatives thereof.

The hydroxyl group-substituted derivative of an aliphatic carboxylic acid is, for example, 12-hydroxystearic acid. The aliphatic carboxylic acid or a substituted derivative thereof may be in the form of a metal salt formed together with a metal element M. The metal element M referred to herein may be the same as or different from the metal element M in the formula (B1).

Examples of the metal atoms represented by M include alkali metal elements, such as lithium, sodium, potassium and rubidium, Group 2 metal elements of the periodic table, such as magnesium, calcium and barium, and Group 13 metal elements of the periodic table, such as aluminum. Of these, alkali metal elements are preferable, sodium and lithium are more preferable, and lithium is particularly preferable.

As the compound (B2), at least one kind selected from aliphatic monocarboxylic acids of 14 to 20 carbon atoms and derivatives thereof is preferable, and myristic acid, stearic acid or 12-hydroxystearic acid is particularly preferable. From the viewpoint of transparency of a container after heat treatment, it is preferable that the compound (B2) is any one of these components.

The transparent melting point of the compound (B2) is preferably higher than 50° C., more preferably higher than 70° C., still more preferably higher than 100° C., particularly preferably higher than 110° C. If the transparent melting point is not higher than 100° C., it sometimes becomes difficult to utilize heat resistance that is a merit of a polypropylene-based molded product. For example, in the case where food or beverage in a container is sterilized by boiling, lowering of transparency of the container or a problem due to elution of the compound (B2) sometimes occurs. The method for measuring the transparent melting point conforms to JIS-K0064: 1992 "Melting Point and Melting Range Measuring Method for Chemical Products".

<Metal Element M>

The metal element M used in the nucleating agent (B) is a monovalent to trivalent metal atom. Examples of the monovalent to trivalent elements include alkali metal elements, such as lithium, sodium, potassium and rubidium, Group 2 metal elements of the periodic table, such as magnesium, calcium and barium, and Group 13 metal elements of the periodic table, such as aluminum. Of these, alkali metal elements, such as lithium, sodium, potassium and rubidium, are preferable, sodium and lithium are more preferable, and lithium is particularly preferable.

The alkali metal element contained in the nucleating agent (B) can be examined by subjecting the propylene resin composition of the present invention or a stretched container formed of the composition to extraction, dissolution precipitation or other treatment such as ashing and then performing atomic absorption, ion chromatography, inductively coupled plasma emission spectrometry (ICP emission) or the like.

The alkali metal element contained in the nucleating agent (B) may be present as an organophosphoric ester compound represented by the formula (B1) (M in the formula (B1) =alkali metal element), or may be present as an alkali metal salt of an aliphatic carboxylic acid or a substituted derivative thereof. In the present invention, therefore, it is preferable to use, as the nucleating agent (B), a nucleating agent containing at least one kind selected from compounds wherein M in the organophosphoric ester compounds represented by the formula (B1) is an alkali metal element, alkali metal salts of aliphatic carboxylic acids, and alkali metal salts of substituted derivatives of aliphatic carboxylic acids.

Specifically, a combination of a compound wherein M in the organophosphoric ester compound represented by the formula (B1) is an alkali metal element and at least one kind selected from aliphatic carboxylic acids and derivatives thereof, or a combination of the organophosphoric ester compound represented by the formula (B1) and an alkali metal salt of an aliphatic carboxylic acid or a substituted derivative thereof can be mentioned as the nucleating agent (B). In particular, a combination of a compound wherein M in the organophosphoric ester compound represented by the formula (B1) is an alkali metal element and an alkali metal salt of an aliphatic carboxylic acid or a substituted derivative thereof is preferable.

<Commercial Products of Nucleating Agents (B)>

As the nucleating agent containing the organophosphoric ester compound represented by the formula (B1), a commercial product may be used. For example, as the nucleating agent containing lithium-2,2'-methylenebis(4,6-di-t-butylphenyl)phosphate and 12-hydroxystearic acid and containing lithium as an essential component, Adekastab NA-71 (trade name, available from ADEKA CORPORATION) can be mentioned, and as the nucleating agent containing sodium-2,2'-methylenebis(4,6-di-t-butylphenyl)phosphate and myristic acid and containing sodium as an essential component, Adekastab NA-21 (trade name, available from ADEKA CORPORATION) can be mentioned.

[Additives]

To the propylene resin composition of the present invention, additives, such as heat stabilizer, weathering stabilizer, antistatic agent, slip agent, anti-blocking agent, anti-fogging agent, lubricant, dye, pigment, natural oil, synthetic oil, wax, filler, antioxidant, neutralizer and organic peroxide, can be added when needed, within limits not detrimental to the object of the present invention.

Examples of the organic peroxides include organic peroxides, such as benzoyl peroxide, t-butyl perbenzoate, t-butyl peracetate, t-butyl peroxyisopropyl carbonate, 2,5-dimethyl-2,5-di(benzoylperoxy)hexane, 2,5-dimethyl-2,5-di(benzoylperoxy)hexyne-3, t-butyl diperadipate, t-butyl peroxy-3,5,5-trimethyl hexanoate, methyl ethyl ketone peroxide, cyclohexanone peroxide, di-t-butyl peroxide, dicumyl peroxide, 2,5-dimethyl-2,5-di(t-butylperoxy) hexane, 2,5-dimethyl-2,5-di(t-butylperoxy)hexyne-3, 1,3-bis(t-butylperoxyisopropyl)benzene, t-butylcumylperoxide, 1,1-bis(t-butylperoxy)-3,3,5-trimethylcyclohexane, 1,1-bis (t-butylperoxy)cyclohexane, 2,2-bis(t-butylperoxy)butane, p-menthane hydroperoxide, diisopropybenzene hydroperoxide, cumene hydroperoxide, t-butyl hydroperoxide, p-cymene hydroperoxide, 1,1,3,3-tetramethylbutyl hydroperoxide and 2,5-dimethyl-2,5-di(hydroperoxy)hexane. Of these, 2,5-dimethyl-2,5-di(benzoylperoxy)hexane or 1,3-bis(t-butylperoxyisopropyl)benzene is more preferable.

By the use of an organic peroxide, MFR of the propylene resin composition of the present invention can be controlled. The amount of the organic peroxide added is usually not more than 0.1 part by weight, preferably 0 to 0.05 part by weight, more preferably 0 to 0.03 part by weight, still more preferably 0 to 0.02 part by weight, based on 100 parts by weight of the propylene resin (A).

As other additives, 2,6-di-t-butyl-4-ethylphenol (BHT) and calcium stearate can be used, and the amount of each of them is preferably not more than 0.1 part by weight based on 100 parts by weight of the propylene resin (A). It is more preferable not to add the BHT and calcium stearate to the resin composition of the present invention.

Moreover, other known additives such as hydrogenated petroleum resin can be used. For example, I-MARV (trade name) available from Idemitsu Kosan Co., Ltd. can be added.

[Preparation of Propylene Resin Composition]

By mixing the propylene resin (A), the nucleating agent (B), and if necessary, other additives by the use of a Henschel mixer, a V-type blender, a tumbler blender, a ribbon blender or the like and then melt-kneading the mixture by the use of a single screw extruder, a twin-screw extruder, a kneader, a Banbury mixer or the like, a propylene resin composition of high quality in which the above components have been homogeneously dispersed and mixed can be obtained. The resin temperature during the melt kneading is usually 180 to 280° C., more preferably 200 to 260° C.

The propylene resin composition of the present invention has a wide stretch blow molding temperature range. Further, a stretched container obtained by using the propylene resin composition of the present invention has small container shrinkage after heat treatment and has excellent transparency of the container side surface even after heat treatment.

[Stretched Container Formed of Propylene Resin Composition]

The stretched container of the present invention can be obtained by, for example, subjecting the aforesaid propylene resin composition to stretch blow molding. Specifically, the stretched container of the present invention can be obtained by melting the propylene resin composition, injection molding the resin composition in a mold to form a preform, then heating the preform when needed, thereafter forcibly stretching the preform longitudinally by the use of a stretching rod and introducing a heated gas into the preform to stretch the preform laterally.

The temperature for melting and injecting the propylene resin composition is usually in the range of 180 to 280° C. The preheating temperature (preform surface temperature) of the preform is usually 90 to 140° C. Longitudinal stretching is usually carried out at a longitudinal stretching temperature of 90 to 140° C. in a longitudinal stretch ratio of 1.5 to 4.0 times, and lateral stretching is usually carried out at a lateral stretching temperature of 90 to 140° C. in a lateral stretch ratio of 1.5 to 4.0 times.

EXAMPLES

The present invention is more specifically described with reference to the following examples, but it should be construed that the present invention is in no way limited to those examples. In the description of the following examples, etc., the term "part(s)" means "part(s) by weight", unless otherwise noted.

[Evaluation Methods]

[Content of Constituent Unit]

The content of each constituent unit in the propylene resin (A1) and the propylene resin (A2) was determined by measuring it by $^{13}$C-NMR under the following conditions.

($^{13}$C-NMR Measurement Conditions)

Measuring device: JEOL LA400 type nuclear magnetic resonance device

Measurement mode: BCM (bilevel complete decoupling)
Observation frequency: 100.4 MHz
Observation range: 17006.8 Hz
Pulse width: C nucleus 45° (7.8 μsec)
Pulse repetition time: 5 seconds
Sample tube: 5 mmø
Sample tube rotational speed: 12 Hz
Cumulative number of times: 20000
Measurement temperature: 125° C.
Solvent: 1,2,4-trichlorobenzene: 0.35 ml/deuterated benzene: 0.2 ml
Sample quantity: about 40 mg

[MFR (Melt Flow Rate)]

MFR of each of the propylene resin (A1), the propylene resin (A2) and the propylene resin composition was measured at a measurement temperature of 230° C. under a load of 2.16 kg in accordance with ASTM D-1238.

[Crystalline Melting Point (Tm)]

Crystalline melting point of each of the propylene resin (A1), the propylene resin (A2) and the propylene resin composition was measured using a differential scanning calorimeter (DSC, manufactured by PerkinElmer, Inc. (Diamond DSC)) in accordance with JIS-K7121. A top of an endothermic peak in the third step, as measured under the following conditions, was defined as a crystalline melting point (Tm). When plural endothermic peaks were present, the maximum endothermic peak top was defined as a crystalline melting point (Tm).

Measurement environment: nitrogen gas atmosphere
Sample quantity: 5 mg
Sample shape: pressed film (molded at 230° C., thickness: 200 to 400 μm)
First step: The temperature is raised up to 240° C. from 30° C. at 10° C./min and maintained for 10 minutes.
Second step: The temperature is lowered down to 60° C. at 10° C./min.
Third step: The temperature is raised up to 240° C. at 10° C./min.

[Temperature Rising Elution Fractionation Chromatograph (TREF)]

An elution curve of the propylene resin composition based on a temperature rising elution fractionation chromatograph (TREF) was obtained in the following manner. A sample solution was introduced into a TREF column having been adjusted to a temperature of 160° C., and the sample was dissolved for 60 minutes. Thereafter, the solution was cooled down to 95° C. and allowed to stand still for 45 minutes. Subsequently, the temperature was gradually lowered down to 0° C. at a rate of 0.5° C./min to allow the filler to adsorb the sample. Thereafter, the column was heated up to 140° C. at a rate of 1.0° C./min to obtain an elution curve. The measuring device and the measurement conditions are described below.

When a main elution peak temperature in the resulting elution curve is represented by Tp, the elution quantity in a temperature range higher than Tp (higher than Tp (° C.) but not higher than 135° C.), based on the total elution quantity in a temperature range of 0 to 135° C., is represented by Wp1 (% by weight), and the elution quantity in a temperature range not higher than 10° C. (0 to 10° C.), based on the total elution quantity in a temperature range of 0 to 135° C., is represented by Wp2 (% by weight).

1) Measuring Device
Measuring device: Polymer ChAR TREF200+
TREF column: stainless steel column (⅜" o.d.×15 cm)
Flow cell: manufactured by GL Sciences Inc., optical path length: 1 mm, KBr cell
Liquid feed pump: Agilent Technologies 1200 Series
Valve oven: GL Science MODEL 554 oven
Main oven: Agilent Technologies 7890A GC System
Two series temperature controller: REX-C100 temperature controller manufactured by Rigaku Kogyo Co., Ltd.
Detector: Polymer ChAR IR4
FOXBORO MIRAN 1A CVF Ten-port valve: Valco electrically operated valve
Loop: Valco 500 μliter loop
2) Measurement Conditions
Solvent: orthodichlorobenzene (300 ppm, containing BHT)
Sample concentration: 0.40% (w/v)
Injection quantity: 0.3 ml
Pump flow rate: 0.51 mL/min
Detection wave number: 3.41 μm
Column filler: stainless steel beads
Column temperature distribution: within ±2.0° C.
[Stretch Blow Molding Temperature Range]

The propylene resin composition was subjected to injection stretch blow molding by means of an injection stretch blow molding machine [manufactured by Nissei ASB Machine Co., Ltd., PF6-2B] to produce a container in the form of a PET bottle having a volume of 300 ml (bottle having a barrel part thickness of 0.8 mm).

Specifically, the propylene resin composition was first melted at a resin temperature of 200° C. by means of an injection molding machine and injection molded in a first mold, which had been temperature controlled to 15° C. by a water circulation circuit, to produce a preform. Subsequently, this preform was transferred into a preheating zone and heated by an infrared heater. Then, the preform was subjected to preblowing, and immediately thereafter, the preform was longitudinally and laterally stretched by the use of a stretching rod and blowing air, whereby the preform was stretched about 2.0 times longitudinally and about 1.5 times laterally. The stretched preform was hardened by cooling in a blow mold, and the resulting bottle was taken out. The preform surface temperature immediately before introduction of the preform into the blow mold was measured by a non-contact type thermometer. A difference between the surface temperature lower limit and the surface temperature upper limit in the preform preheating in which blow molding was possible was regarded as a stretch blow molding temperature range. Further, stretching was carried out within the stretch blow molding temperature range. For example, in Example 1, stretching was carried out at a longitudinal stretching temperature and a lateral stretching temperature each being 126° C.

[Volume Retention Ratio of Container and Transparency (HAZE) of Container Side Surface after Heat Treatment]

Under the conditions described in the above [Stretch blow molding temperature range], bottles each having a barrel part thickness of 0.8 mm were produced. From them, 10 bottles were selected, and they were subjected to conditioning for 48 hours in standard conditions (25° C., 1 atm.). Five bottles having been subjected to conditioning were filled with water to the top, and weight of the water was measured. The weight of the water thus measured is represented by (W1).

Using TABAI PERFECT OVEN PH-400 (manufactured by ESPEC CORP.), the residual five bottles having been subjected to conditioning were stored in a standing state inside an oven having been preheated to 120° C. in advance, and heat treatment was carried out for 6 hours under the conditions of 120° C. and 1 atm.

Bottles having been allowed to cool down to ordinary temperature (25° C.) after the heat treatment were used, and the bottles were filled with water to the top, and weight of the water was measured. The weight of the water thus measured is represented by (W2). A value obtained by dividing (W2) by (W1) was converted to %, and the resulting numerical value was regarded as a volume retention ratio of a container after heat treatment.

A bottle having been allowed to cool down to ordinary temperature (25° C.) after the heat treatment was used, and a sample for haze measurement was cut out from an almost central part of the bottle side surface. The sample was analyzed by a haze meter (NIPPON DENSHOKU (NDH2000)) in accordance with JIS-K7105. A haze value was measured in accordance with ASTM D1003. The haze value thus measured was regarded as transparency (HAZE) of the container side surface after heat treatment. It can be said that as HAZE is decreased, transparency is more excellent.

Synthesis Example 1: Production of Propylene Resin (A1-1)

(1) Preparation of Solid Catalyst Component 95.2 g of anhydrous magnesium chloride, 442 ml of decane and 390.6 g of 2-ethylhexyl alcohol were used, and they were subjected to thermal reaction at 130° C. for 2 hours to give a homogeneous solution. Thereafter, to this solution was added 21.3 g of phthalic anhydride, and they were further stirred and mixed at 130° C. for 1 hour to dissolve phthalic anhydride.

The homogeneous solution obtained as above was cooled to room temperature, and thereafter, to 200 ml of titanium tetrachloride having been maintained at −20° C., 75 ml of this homogeneous solution was dropwise added over a period of 1 hour.

After the addition was completed, the temperature of this mixed solution was raised to 110° C. over a period of 4 hours. When a temperature of 110° C. was reached, 5.22 g of diisobutyl phthalate (DIBP) was added, and then, they were stirred and maintained for 2 hours at the same temperature. After the reaction of 2 hours was completed, the solid matter was collected by hot filtration, and the solid matter was resuspended in 275 ml of titanium tetrachloride and then heated again at 110° C. for 2 hours.

After the reaction was completed, the solid matter was collected by hot filtration again, and the solid matter was sufficiently washed with decane and hexane at 110° C. until no liberated titanium compound came to be detected in the solution. The solid mater after washing was taken as a solid titanium catalyst component (A).

The solid titanium catalyst component (A) was stored as a decane slurry, and a part of it was dried for the purpose of examining composition of the catalyst. The solid titanium catalyst component (A) had composition of 2.3% by weight of titanium, 61% by weight of chlorine, 19% by weight of magnesium and 12.5% by weight of DIBP.

Detection of the liberated titanium compound was carried out in the following manner. 10 ml of a supernatant liquid of the solid catalyst component was withdrawn with a syringe and introduced in a 100 ml side-arm Schlenk flask having been purged with nitrogen in advance. Next, the solvent hexane was dried in a stream of nitrogen, and vacuum drying was further carried out for 30 minutes. Then, 40 ml of ion-exchanged water and 10 ml of 50 vol % sulfuric acid were added, followed by stirring for 30 minutes. This aqueous solution was transferred into a 100 ml measuring flask through a filter paper. Subsequently, 1 ml of conc. $H_3PO_4$ as a masking agent for iron(II) ion and 5 ml of a 3% $H_2O_2$ aqueous solution as a coloring reagent for titanium were added, and ion-exchanged water was further added to make up the total 100 ml. This measuring flask was shaken, and after 20 minutes, an absorbance at 420 nm was observed by the use of UV to carry out detection of liberated titanium.

Until this absorption came to be not observed, removal of liberated titanium by washing and detection of liberated titanium were carried out.

(2) Preparation of Prepolymerized Catalyst Component

After a three-neck flask having an internal volume of 500 ml and equipped with a stiller was purged with nitrogen gas, 400 ml of dehydrated heptane, 19.2 mmol of triethylaluminum, 3.8 mmol of dicyclopentyldimethoxysilane and 4 g of the solid titanium catalyst component (A) were placed. The internal temperature was maintained at 20° C., and propylene gas was continuously introduced at a rate of 8 g/hr while stirring. After 1 hour, stirring was terminated, and as a result, a prepolymerized catalyst component (B) in which 2 g of propylene had been polymerized based on 1 g of the solid titanium catalyst component (A) was obtained.

(3) Polymerization

After a stainless steel autoclave having an internal volume of 10 liters and equipped with a stirrer was sufficiently dried and purged with nitrogen, 6 liters of dehydrated heptane, 12.5 mmol of triethylaluminum and 0.6 mmol of dicyclopentyldimethoxysilane were placed. After nitrogen in the system was replaced with propylene, hydrogen was fed at 0.55 MPa-G (*1), and subsequently, propylene and ethylene were introduced while stirring. The amounts of them introduced were adjusted so that the ethylene concentration (*2) in the gas phase part in the polymerization tank might become 1.4% by mol.

After the system was stabilized at an internal temperature of 80° C. and a total pressure of 1.1 MPa-G (*3), 20.8 ml of a heptane slurry containing the prepolymerized catalyst component (B) in an amount of 0.10 mmol in terms of Ti atom was added, and polymerization was carried out at 80° C. for 3 hours while continuously feeding propylene and ethylene so as to maintain the total pressure and the ethylene concentration.

After the lapse of a given period of time, 50 ml of methanol was added to terminate the reaction, and temperature drop and pressure release were carried out. The total amount of the contents was transferred into a filtration tank equipped with a filter, then the temperature was raised to 60° C., and solid-liquid separation was carried out. Further, the solid matter was washed with 6 liters of heptane at 60° C. twice. A propylene/ethylene copolymer (propylene resin (A1-1)) thus obtained was vacuum dried.

The melt flow rate (MFR) (ASTM-D-1238, measurement temperature: 230° C., load: 2.16 kg) of the resulting propylene resin (A1-1) was 30.0 g/10 min. When the total amount of constituent units derived from propylene and constituent units derived from ethylene in the resin (A1-1) was 100% by weight, the amount of the constituent units derived ethylene, as calculated by $^{13}$C-NMR, was 3.4% by weight. The DSC melting point (crystalline melting point measured by DSC in accordance with JIS-K7121) of the resin (A1-1) was 142° C.

Synthesis Examples 2 to 9

Propylene resins (A1-2) to (A1-5) and propylene resins (A2-1) and (A2-4) were obtained in the same manner as in Synthesis Example 1, except that the polymerization conditions, namely, *1: amount of hydrogen fed to polymerization tank, *2: ethylene concentration in gas phase part in polymerization tank, and *3: internal temperature and total pressure in system after stabilization, were changed as described in Table 1.

TABLE 1

| | | Unit | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 | Synthesis Ex. 9 |
|---|---|---|---|---|---|---|---|---|---|---|---|
| | Propylene resin | | A1-1 | A1-2 | A1-3 | A1-4 | A1-5 | A2-1 | A2-2 | A2-3 | A2-4 |
| Polymerization conditions | *1 Amount of hydrogen fed to polymerization tank | MPa-G | 0.55 | 0.18 | 0.55 | 0.55 | 0.55 | 0.55 | 0.18 | 0.55 | 0.55 |
| | *2 Ethylene concentration in gas phase part in polymerization tank | mol % | 1.4 | 1.4 | 1.0 | 2.2 | 2.6 | 0.1 | 0.1 | 0 | 0.9 |
| | *3 Internal temperature of system after stabilization | °C. | 80 | 80 | 80 | 80 | 80 | 80 | 80 | 80 | 80 |
| | *3 Total pressure of system after stabilization | MPa-G | 1.1 | 0.7 | 1.1 | 1.1 | 1.1 | 1.1 | 0.7 | 1.1 | 1.1 |
| Properties of propylene resin | MFR (ASTM D-1238, 230° C., 2.16 kg) | g/10 min | 30.0 | 5.0 | 30.0 | 30.0 | 30.0 | 30.0 | 5.0 | 30.0 | 30.0 |
| | Ethylene content | wt % | 3.4 | 3.4 | 1.9 | 4.8 | 5.5 | 0.1 | 0.1 | 0 | 1.8 |
| | Crystalline melting point (JIS-K7121) | ° C. | 142 | 142 | 150 | 136 | 128 | 162 | 162 | 165 | 151 |

Example 1

In a Henschel mixer, 95 parts by weight of the propylene resin (A1-1) and 5 parts by weight of the propylene resin (A2-1) as the propylene resins (A), 0.15 part by weight of Adekastab NA-71 (available from ADEKA CORPORATION) as the nucleating agent (B), and, as additives, 0.10 part by weight of tris(2,4-di-t-butylphenyl)phosphite as a phosphorus-based antioxidant and 0.04 part by weight of hydrotalcite as a neutralizer were stirred and mixed.

The resulting mixture was melt-kneaded under the following conditions by the use of a twin-screw extruder (TEM35BS) manufactured by Toshiba Machine Co., Ltd. to obtain a strand. The resulting strand was water-cooled and then cut by a pelletizer to obtain pellets of a propylene resin composition.

Model: TEM35BS (35 mm twin-screw extruder)
Screw rotational speed: 300 rpm
Screen mesh: #200
Resin temperature: 220° C.

The propylene resin composition had a melt flow rate (MFR) (ASTM D-1238, measurement temperature: 230° C., load: 2.16 kg) of 30.0 g/10 min and a DSC melting point (crystalline melting point measured by DSC in accordance with JIS-K7121) of 147° C.

The results are set forth in Table 2A together with the results of measurement with a temperature rising elution fractionation chromatograph.

Subsequently, using the pellets, stretch blow molding was carried out in accordance with the aforesaid [Evaluation methods]. The stretch blow molding temperature range was 14° C., the volume retention ratio after heat treatment was 99%, and the HAZE of the container side surface after heat treatment was 3%.

Examples 2 to 9, Comparative Examples 1 to 13

Propylene resin compositions were obtained in the same manner as in Example 1, except that the types and the ratio of the components used in the preparation of a propylene resin composition were changed as described in Table 2A and Table 2B. The resulting compositions were evaluated in accordance with the aforesaid [Evaluation methods].

Details of the components shown in Table 2A and Table 2B are as follows.

Adekastab NA-71: available from ADEKA CORPORATION

Adekastab NA-21: available from ADEKA CORPORATION

GEL ALL MD (available from New Japan Chemical Co., Ltd., 1,3,2,4-di-(p-methylbenzylidene)sorbitol)

TABLE 2A

| | | | Unit | Ex. 1 | Ex. 2 | Ex. 3 | Ex. 4 | Ex. 5 |
|---|---|---|---|---|---|---|---|---|
| Propylene resin composition (constitution) | Propylene resin (A1) | (A1-1): melting point (Tm) 142° C. | wt. part(s) | 95 | 60 | 98 | | |
| | | (A1-2): melting point (Tm) 142° C. | wt. part(s) | | | | | |
| | | (A1-3): melting point (Tm) 150° C. | wt. part(s) | | | | 60 | |
| | | (A1-4): melting point (Tm) 136° C. | wt. part(s) | | | | | 98 |
| | | (A1-5): melting point (Tm) 128° C. | wt. part(s) | | | | | |
| | Propylene resin (A2) | (A2-1): melting point (Tm) 162° C. | wt. part(s) | 5 | 40 | 2 | | |
| | | (A2-2): melting point (Tm) 162° C. | wt. part(s) | | | | | |
| | | (A2-3): melting point (Tm) 165° C. | wt. part(s) | | | | 40 | |
| | | (A2-4): melting point (Tm) 151° C. | wt. part(s) | | | | | 2 |
| | Nucleating agent (B) | Adekastab NA-71 | wt. part(s) | 0.15 | 0.25 | 0.25 | 0.50 | 0.05 |
| | | Adekastab NA-21 | wt. part(s) | | | | | |
| | Other nucleating agent (B') | GEL ALL MD | wt. part(s) | | | | | |
| | Phosphorus-based antioxidant | Tris(2,4-di-t-butylphenyl)phosphite | wt. part(s) | 0.10 | 0.10 | 0.10 | 0.10 | 0.10 |
| | Neutralizer | Hydrotalcite | wt. part(s) | 0.04 | 0.04 | 0.04 | 0.04 | 0.04 |
| | Organic peroxide | 2,5-Dimethyl-2,5-di(benzoylperoxy)hexane | wt. part(s) | | | | | |
| Propylene resin composition (properties) | MFR (ASTM D-1238, measurement temperature 230° C., load 2.16 kg) | | g/10 min | 30.0 | 30.0 | 30.0 | 30.0 | 30.0 |
| | Melting point (in accordance with JIS-K7121, crystalline melting point measured by DSC) | | ° C. | 147 | 153 | 146 | 155 | 140 |
| | Absolute value of difference in melting point between resin (A1) and resin (A2) | | ° C. | 20 | 20 | 20 | 15 | 15 |
| | Temperature rising elution fractionation chromatograph | Wp1 | wt % | 31.0 | 39.0 | 29.0 | 30.5 | 28.0 |
| | | Wp2 | wt % | 2.6 | 1.9 | 2.8 | 0.8 | 3.0 |
| | Stretch blow molding temperature range | Surface temperature lower limit | ° C. | 122 | 125 | 120 | 126 | 118 |
| | | Surface temperature width | ° C. | 14 | 10 | 10 | 10 | 12 |
| | Container after heat treatment | Volume retention ratio | % | 99 | 98 | 98 | 99 | 98 |
| | | Transparency of container side surface (HAZE) | % | 3 | 5 | 4 | 5 | 4 |

| | | | Unit | Ex. 6 | Ex. 7 | Ex. 8 | Ex. 9 |
|---|---|---|---|---|---|---|---|
| Propylene resin composition (constitution) | Propylene resin (A1) | (A1-1): melting point (Tm) 142° C. | wt. part(s) | | 95 | 95 | |
| | | (A1-2): melting point (Tm) 142° C. | wt. part(s) | 95 | | | 95 |
| | | (A1-3): melting point (Tm) 150° C. | wt. part(s) | | | | |
| | | (A1-4): melting point (Tm) 136° C. | wt. part(s) | | | | |
| | | (A1-5): melting point (Tm) 128° C. | wt. part(s) | | | | |
| | Propylene resin (A2) | (A2-1): melting point (Tm) 162° C. | wt. part(s) | | 5 | 5 | |
| | | (A2-2): melting point (Tm) 162° C. | wt. part(s) | 5 | | | 5 |
| | | (A2-3): melting point (Tm) 165° C. | wt. part(s) | | | | |
| | | (A2-4): melting point (Tm) 151° C. | wt. part(s) | | | | |
| | Nucleating agent (B) | Adekastab NA-71 | wt. part(s) | 0.15 | 0.15 | | 0.15 |
| | | Adekastab NA-21 | wt. part(s) | | | 0.15 | |
| | Other nucleating agent (B') | GEL ALL MD | wt. part(s) | | | | |
| | Phosphorus-based antioxidant | Tris(2,4-di-t-butylphenyl)phosphite | wt. part(s) | 0.10 | 0.10 | 0.10 | 0.10 |
| | Neutralizer | Hydrotalcite | wt. part(s) | 0.04 | 0.04 | 0.04 | 0.04 |
| | Organic peroxide | 2,5-Dimethyl-2,5-di(benzoylperoxy)hexane | wt. part(s) | 0.005 | 0.04 | | 0.007 |
| Propylene resin composition (properties) | MFR (ASTM D-1238, measurement temperature 230° C., load 2.16 kg) | | g/10 min | 11.0 | 100.0 | 30.0 | 15.0 |
| | Melting point (in accordance with JIS-K7121, crystalline melting point measured by DSC) | | ° C. | 147 | 147 | 147 | 147 |
| | Absolute value of difference in melting point between resin (A1) and resin (A2) | | ° C. | 20 | 20 | 20 | 20 |
| | Temperature rising elution fractionation chromatograph | Wp1 | wt % | 31.0 | 31.0 | 30.5 | 31.0 |
| | | Wp2 | wt % | 2.6 | 2.6 | 2.8 | 2.6 |

TABLE 2A-continued

|  |  | | | | | |
|---|---|---|---|---|---|---|
| Stretch blow molding temperature range | Surface temperature lower limit | °C. | 122 | 124 | 122 | 122 |
|  | Surface temperature width | °C. | 16 | 10 | 13 | 15 |
| Container after heat treatment | Volume retention ratio | % | 98 | 99 | 99 | 98 |
|  | Transparency of container side surface (HAZE) | % | 3 | 3 | 8 | 3 |

TABLE 2B

| | | | Unit | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Propylene resin composition (constitution) | Propylene resin (A1) | (A1-1): melting point (Tm) 142° C. | wt. part(s) | 100 | 100 | 100 | | | | 95 |
| | | (A1-2): melting point (Tm) 142° C. | wt. part(s) | | | | | | | |
| | | (A1-3): melting point (Tm) 150° C. | wt. part(s) | | | | | | | |
| | | (A1-4): melting point (Tm) 136° C. | wt. part(s) | | | | | | | |
| | | (A1-5): melting point (Tm) 128° C. | wt. part(s) | | | | | | | |
| | Propylene resin (A2) | (A2-1): melting point (Tm) 162° C. | wt. part(s) | | | | 100 | 100 | 100 | 5 |
| | | (A2-2): melting point (Tm) 162° C. | wt. part(s) | | | | | | | |
| | | (A2-3): melting point (Tm) 165° C. | wt. part(s) | | | | | | | |
| | | (A2-4): melting point (Tm) 151° C. | wt. part(s) | | | | | | | |
| | Nucleating agent (B) | Adekastab NA-71 | wt. part(s) | 0.15 | | | 0.15 | | | |
| | | Adekastab NA-21 | wt. part(s) | | 0.15 | | | 0.15 | | |
| | Other nucleating agent (B') | GEL ALL MD | wt. part(s) | | | 0.20 | | | 0.20 | |
| | Phosphorus-based antioxidant | Tris(2,4-di-t-butylphenyl)phosphite | wt. part(s) | 0.10 | 0.10 | 0.10 | 0.10 | 0.10 | 0.10 | 0.10 |
| | Neutralizer | Hydrotalcite | wt. part(s) | 0.04 | 0.04 | 0.04 | 0.04 | 0.04 | 0.04 | 0.04 |
| | Organic peroxide | 2,5-Dimethyl-2,5-di(benzoylperoxy)hexane | wt. part(s) | | | | | | | |

| | | | Unit | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|
| Propylene resin composition (constitution) | Propylene resin (A1) | (A1-1): melting point (Tm) 142° C. | wt. part(s) | 95 | | | | | 95 |
| | | (A1-2): melting point (Tm) 142° C. | wt. part(s) | | | | 95 | 95 | |
| | | (A1-3): melting point (Tm) 150° C. | wt. part(s) | | | | 5 | | |
| | | (A1-4): melting point (Tm) 136° C. | wt. part(s) | | | | | | |
| | | (A1-5): melting point (Tm) 128° C. | wt. part(s) | | 95 | | | | |
| | Propylene resin (A2) | (A2-1): melting point (Tm) 162° C. | wt. part(s) | 5 | 5 | 5 | | | 5 |
| | | (A2-2): melting point (Tm) 162° C. | wt. part(s) | | | | | 5 | |
| | | (A2-3): melting point (Tm) 165° C. | wt. part(s) | | | | | | |
| | | (A2-4): melting point (Tm) 151° C. | wt. part(s) | | | 95 | | | |
| | Nucleating agent (B) | Adekastab NA-71 | wt. part(s) | | 0.15 | 0.15 | 0.15 | 0.15 | 0.15 |
| | | Adekastab NA-21 | wt. part(s) | | | | | | |
| | Other nucleating agent (B') | GEL ALL MD | wt. part(s) | 0.20 | | | | | |
| | Phosphorus-based antioxidant | Tris(2,4-di-t-butylphenyl)phosphite | wt. part(s) | 0.10 | 0.10 | 0.10 | 0.10 | 0.10 | 0.10 |
| | Neutralizer | Hydrotalcite | wt. part(s) | 0.04 | 0.04 | 0.04 | 0.04 | 0.04 | 0.04 |
| | Organic peroxide | 2,5-Dimethyl-2,5-di(benzoylperoxy)hexane | wt. part(s) | | | | | 0.003 | 0.045 |

| | | | Unit | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Propylene resin composition (properties) | MFR (ASTM D-1238, measurement temperature 230° C., load 2.16 kg) | | g/10 min | 30.0 | 30.0 | 30.0 | 30.0 | 30.0 | 30.0 | 30.0 |
| | Melting point (in accordance with JIS-K7121, crystalline melting point measured by DSC) | | °C. | 145 | 145 | 146 | 164 | 164 | 164 | 144 |
| | Absolute value of difference in melting point between resin (A1) and resin (A2) | | °C. | — | — | — | — | — | — | 20 |
| | Temperature rising elution fractionation chromatograph | Wp1 | wt % | 25.0 | 25.5 | 25.0 | 19.0 | 18.5 | 19.0 | 30.0 |
| | | Wp2 | wt % | 3.0 | 3.3 | 3.2 | 1.7 | 2.1 | 2.0 | 4.2 |
| | Stretch blow molding temperature range | Surface temperature lower limit | °C. | 122 | 122 | 122 | 138 | 138 | 138 | 122 |
| | | Surface temperature width | °C. | 4 | 4 | 4 | 1 | 1 | 1 | 6 |
| | Container after heat treatment | Volume retention ratio | % | 95 | 95 | 95 | 92 | 92 | 92 | 96 |
| | | Transparency of container side surface (HAZE) | % | 7 | 7 | 7 | 15 | 15 | 13 | 11 |

| | | | Unit | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|
| Propylene resin composition (properties) | MFR (ASTM D-1238, measurement temperature 230° C., load 2.16 kg) | | g/10 min | 30.0 | 30.0 | 30.0 | 30.0 | 8.0 | 110.0 |
| | Melting point (in accordance with JIS-K7121, crystalline melting point measured by DSC) | | °C. | 148 | 132 | 153 | 146 | 147 | 147 |

TABLE 2B-continued

|  |  |  |  |  |  |  |  |
|---|---|---|---|---|---|---|---|
| Absolute value of difference in melting point between resin (A1) and resin (A2) | | ° C. | 20 | 34 | 11* | 8* | 20 | 20 |
| Temperature rising elution fractionation chromatograph | Wp1 | wt % | 31.0 | 36.0 | 25.5 | 26.0 | 31.0 | 31.0 |
|  | Wp2 | wt % | 2.6 | 4.5 | 1.8 | 3.0 | 2.4 | 2.8 |
| Stretch blow molding temperature range | Surface temperature lower limit | ° C. | 122 | 112 | 130 | 124 | 122 | 125 |
|  | Surface temperature width | ° C. | 13 | 10 | 4 | 4 | 16 | 3 |
| Container after heat treatment | Volume retention ratio | % | 98 | 89 | 95 | 95 | 95 | 99 |
|  | Transparency of container side surface (HAZE) | % | 9 | unmeasurable | 7 | 7 | 6 | 3 |

*In Comparative Examples 10 and 11, only one of the resin (A1) and the resin (A2) was used, and therefore, a difference in melting point between two kinds of the resins was described.

In each of Examples, a propylene resin composition containing the propylene resin (A) and a specific nucleating agent (B) and having a melt flow rate (MFR), a crystalline melting point and Wp1 and Wp2 based on TREF, each being within a proper range, was used, and therefore, the stretch blow molding temperature range was wide, and the volume retention ratio and the transparency of the resulting stretched container after heat treatment were excellent. Here, when the surface temperature width was not lower than 10° C., the volume retention ratio was not less than 96%, and the HAZE value was not more than 8%, these properties were judged to be excellent.

In Comparative Examples 1 to 3, the propylene resin (A2) was not blended, and therefore, Wp1 based on TREF was decreased. As a result, the stretch blow molding temperature range was narrow, and the volume retention ratio after heat treatment was deteriorated.

In Comparative Examples 4 to 6, the propylene resin (A1) was not blended, and therefore, Wp1 based on TREF was decreased. As a result, the stretch blow molding temperature range was narrow, and the volume retention ratio and the transparency after heat treatment were deteriorated.

In Comparative Example 7, the nucleating agent (B) was not blended, and therefore, Wp2 based on TREF was increased. As a result, the stretch blow molding temperature range was narrow, and the transparency after heat treatment was deteriorated. In Comparative Example 8, a nucleating agent different form the nucleating agent (B) was blended, and therefore, the transparency of the container side surface after heat treatment was deteriorated.

In Comparative Example 9, the measured crystalline melting point of the resin composition was low, and therefore, Wp2 based on TREF was increased. As a result, the volume retention ratio and the transparency after heat treatment were deteriorated.

In Comparative Example 10, the propylene resin (A1) was not used and a difference in melting point between two kinds of the propylene resins (A2) was small, and therefore, Wp1 based on TREF was decreased. As a result, the stretch blow molding temperature range was narrow, and the volume retention ratio after heat treatment was deteriorated.

In Comparative Example 11, the propylene resin (A2) was not used and a difference in melting point between two kinds of the propylene resins (A1) was small, and therefore, Wp1 based on TREF was decreased. As a result, the stretch blow molding temperature range was narrow, and the volume retention ratio after heat treatment was deteriorated.

In Comparative Example 12, the melt flow rate (MFR) of the propylene resin composition was low, and therefore, the volume retention ratio after heat treatment was deteriorated. In Comparative Example 13, the melt flow rate (MFR) of the propylene resin composition was high, and therefore, the stretch blow molding temperature range was narrow.

The invention claimed is:

1. A polypropylene-based stretched container formed of a propylene resin composition,
   wherein the propylene resin composition comprises:
   100 parts by weight of (A) a propylene resin, and
   0.05 to 0.5 part by weight of (B) a nucleating agent containing an organophosphoric ester compound represented by the formula (B1) and at least one kind selected from aliphatic carboxylic acids and derivatives thereof and containing an alkali metal element as an essential component, wherein:
   (1) the melt flow rate (MFR) of the composition, as measured at a measurement temperature of 230° C. under a load of 2.16 kg in accordance with ASTM D-1238, is 15 to 100 g/10 min,
   (2) the crystalline melting point of the resin in the composition, as measured by a differential scanning calorimeter (DSC) in accordance with JIS-K7121, is 140 to 155° C.,
   (3) when a main elution peak temperature in an elution curve of the composition determined by a temperature rising elution fractionation chromatograph (TREF) is represented by Tp, the elution quantity Wp1 (% by weight) in a temperature range higher than Tp, based on the total elution quantity in a temperature range of 0 to 135° C., is not less than 26.5% by weight, and
   (4) in an elution curve of the composition determined by a temperature rising elution fractionation chromatograph (TREF), the elution quantity Wp2 (% by weight) in a temperature range not higher than 10° C., based on the total elution quantity in a temperature range of 0 to 135° C., is not more than 4.0% by weight,

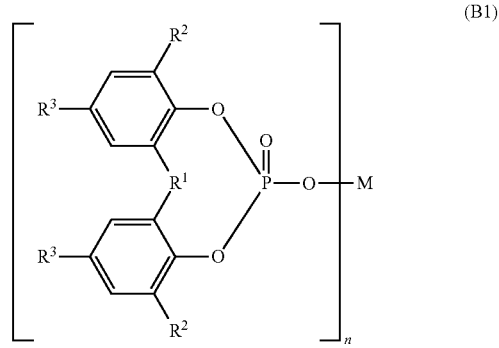

(B1)

wherein $R^1$ is a divalent hydrocarbon group of 1 to 10 carbon atoms, $R^2$ and $R^3$ are each independently hydrogen or a hydrocarbon group of 1 to 10 carbon atoms, $R^2$ and $R^3$ may be the same as or different from each other, M is an n-valent metal atom, and n is an integer of 1 to 3.

2. The polypropylene-based stretched container as claimed in claim 1, wherein the propylene resin (A) comprises:

1 to 99 parts by weight of a propylene resin (A1) which is a copolymer of propylene and at least one α-olefin selected from ethylene and α-olefins of 4 to 20 carbon atoms and has a crystalline melting point, as measured by a differential scanning calorimeter (DSC) in accordance with JIS-K7121, of 130 to 150° C., and 99 to 1 part by weight of a propylene resin (A2) which is a propylene homopolymer or a copolymer of propylene and at least one α-olefin selected from ethylene and α-olefins of 4 to 20 carbon atoms and has a crystalline melting point, as measured by a differential scanning calorimeter (DSC) in accordance with JIS-K7121, of 151 to 165° C., with the proviso that the total amount of the resin (A1) and the resin (A2) is 100 parts by weight.

3. The polypropylene-based stretched container as claimed in claim 2, wherein the at least one kind selected from aliphatic carboxylic acids and derivatives thereof in the nucleating agent (B) is at least one kind selected from aliphatic monocarboxylic acids of 14 to 20 carbon atoms and derivatives thereof.

4. The polypropylene-based stretched container as claimed in claim 2, which comprises 98 to 60 parts by weight of the propylene resin (A1) and 2 to 40 parts by weight of the propylene resin (A2) with the proviso that the total amount of the resin (A1) and the resin (A2) is 100 parts by weight.

5. A propylene resin composition comprising:

100 parts by weight of (A) a propylene resin, and 0.05 to 0.5 part by weight of (B) a nucleating agent containing an organophosphic ester compound represented by the formula (B1) and at least one kind selected from aliphatic carboxylic acids and derivatives thereof and containing an alkali metal element as an essential component, wherein:

(1) the melt flow rate (MFR) of the composition, as measured at a measurement temperature of 230° C. under a load of 2.16 kg in accordance with ASTM D-1238, is 15 to 100 g/10 min, (2) the crystalline melting point of the resin in the composition, as measured by a differential scanning calorimeter (DSC) in accordance with JIS-K7121, is 140 to 155° C., (3) when a main elution peak temperature in an elution curve of the composition determined by a temperature rising elution fractionation chromatograph (TREF) is represented by Tp the elution quantity Wp1 (% by weight) in a temperature range higher than Tp, based on the total elution quantity in a temperature range of 0 to 135° C., not less than 26.5% by weight, and (4) in an elution curve of the composition determined by a temperature rising elution fractionation chromatograph (TREF), the elution quantity Wp2 (% by weight) in a temperature range not higher than 10° C., based on the total elution in a temperature range of 0 to 135° C., is not more than 4.0% by weight,

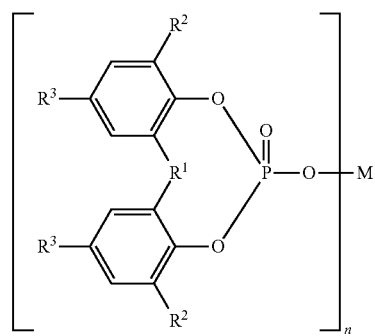

wherein $R^1$ is a divalent hydrocarbon group of 1 to 10 carbon atoms, $R^2$ and $R^3$ are each independently hydrogen or a hydrocarbon group of 1 to 10 carbon atoms, $R^2$ and $R^3$ may be the same as or different from each other, M is an n-valent metal atom, and n is an integer of 1 to 3, wherein the propylene resin (A) comprises:

1 to 99 parts by weight of a propylene resin (A1) which is a copolymer of propylene and at least one α-olefin selected from ethylene and α-olefins of 4 to 20 carbon atoms and has a crystalline melting point, as measured by a differential scanning calorimeter (DSC) in accordance with HIS-K7121, of 130 to 150° C., and 99 to 1 part by weight of propylene resin (A2) which is a propylene homopolymer or a copolymer of propylene and at least one α-olefin selected from ethylene and α-olefins of 4 to 20 carbon atoms and has a crystalline melting point, as measured by a differential scanning calorimeter (DSC) in accordance with JIS-K7121, of 151 to 165° C., with the proviso that the total amount of the resin (A1) and the resin (A2) is 100 parts by weight, and wherein a difference between the crystalline melting point of the propylene resin (A2) and the crystalline melting point of the propylene resin (A1) is 13 to 35° C.

6. The propylene resin composition as claimed in claim 5, wherein the at least one kind selected from aliphatic carboxylic acids and derivatives thereof in the nucleating agent (B) is at least one kind selected from aliphatic monocarboxylic acids of 14 to 20 carbon atoms and derivatives thereof.

7. A polypropylene-based stretched container formed of the propylene resin composition as claimed in claim 6.

8. A polypropylene-based stretched container formed of the propylene resin composition as claimed in claim 5.

9. A propylene resin composition comprising:

100 parts by eight of (A) a propylene resin, and 0.05 to 0.5 part by weight of (B) a nucleating agent containing an organophosphoric ester compound represented by the formula (B1) and at least one kind selected from aliphatic carboxylic acids and derivatives thereof and containing an alkali metal element as an essential component, wherein:

(1) the melt flow rate (MFR) of the composition, as measured at a measurement temperature of 230° C. under a load of 2.16 kg in accordance with ASTM D-1238, is 15 to 100 g/10 min, (2) the crystalline melting point of the resin in the composition, as measured by a differential scanning calorimeter (DSC) in accordance with JIS-K7121, is 140 to 155° C., (3) when a main elution peak temperature in an elution curve of the composition determined by a temperature rising elution fractionation chromatograph (TREF) is represented by Tp, the elution quantity Wp1 (% by weight) in a temperature range higher than Tp, based on the total elution quantity in a temperature range of 0 to 135° C., is not less than 26.5% by weight, and (4) in an elution curve of the composition determined by a temperature rising elution fractionation chromatograph (TREF), the elution quantity Wp2 (% by weight) in a temperature range not higher than 10° C., based on the total elution quantity in a temperature range of 0 to 135° C., is not more than 4.0% by weight,

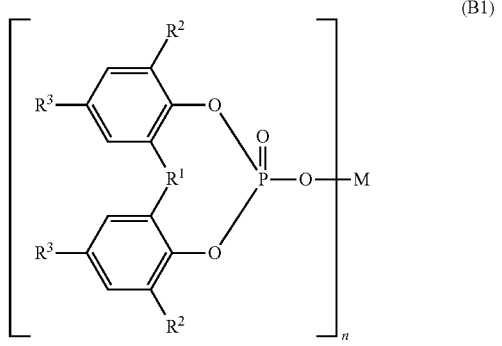

(B1)

wherein $R^1$ is a divalent hydrocarbon group of 1 to 10 carbon atoms, $R^2$ and $R^3$ are each independently hydrogen or a hydrocarbon group of 1 to 10 carbon atoms, $R^2$ and $R^3$ may be the same as or different from each other, M is an n-valent metal atom, and n is an integer of 1 to 3, wherein the at least one kind selected from aliphatic carboxylic acids and derivatives thereof in the nucleating agent (B) is at least one kind selected from aliphatic monocarboxylic acids of 14 to 20 carbon atoms and derivatives thereof.

10. A polypropylene-based stretched container formed of the propylene resin composition as claimed in claim 9.

* * * * *